United States Patent
Iwayama

(10) Patent No.: US 8,508,812 B2
(45) Date of Patent: Aug. 13, 2013

(54) IMAGE READING APPARATUS

(75) Inventor: Akira Iwayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 356 days.

(21) Appl. No.: 12/909,083

(22) Filed: Oct. 21, 2010

(65) Prior Publication Data

US 2011/0261420 A1 Oct. 27, 2011

(30) Foreign Application Priority Data

Apr. 21, 2010 (JP) ................................ 2010-097931

(51) Int. Cl.
*H04N 1/04* (2006.01)

(52) U.S. Cl.
USPC ............................ 358/475; 358/474; 358/509

(58) Field of Classification Search
USPC .................. 358/474, 496, 497, 486, 475, 509
See application file for complete search history.

(56) References Cited

U.S. PATENT DOCUMENTS

| | | | | |
|---|---|---|---|---|
| 3,453,850 A | * | 7/1969 | Weible et al. ...................... | 72/71 |
| 5,121,226 A | * | 6/1992 | Kubota et al. ................. | 358/473 |
| 6,660,987 B2 | * | 12/2003 | Koshimizu ................. | 250/208.1 |
| 7,027,194 B2 | * | 4/2006 | Kanda ............................ | 358/496 |
| 7,289,156 B2 | * | 10/2007 | Silverbrook et al. ......... | 348/374 |
| 7,428,080 B2 | * | 9/2008 | Koshimizu et al. ........... | 358/474 |
| 7,955,255 B2 | * | 6/2011 | Boulais et al. ................ | 600/177 |
| 7,978,379 B2 | * | 7/2011 | Fujiuchi et al. ............... | 358/475 |
| 8,059,315 B2 | * | 11/2011 | Endo et al. .................... | 358/474 |
| 8,169,672 B2 | * | 5/2012 | Yamauchi et al. ............ | 358/475 |
| 8,203,764 B2 | * | 6/2012 | King et al. .................... | 358/450 |

FOREIGN PATENT DOCUMENTS

JP 02242390 A 9/1990

* cited by examiner

*Primary Examiner* — Negussie Worku
(74) *Attorney, Agent, or Firm* — Lowe Hauptman Ham & Berner, LLP

(57) ABSTRACT

An image reading apparatus includes a light source unit, an image sensor, and a light guiding unit at least including a light reflector. The light guiding unit may include a first masking shield and a second masking shield. The light source unit irradiates light toward an original. The image sensor picks up an image of the original based on reflected light of the light by the original. The light guiding unit is provided on an opposite side to the light source unit to cause a part of the light to directly enter into the image sensor, when the original is not fed to the image sensor. The light guiding unit reduces light incident to the image sensor, among the light and light having transmitted through the original, at the time of picking up the image of the original by the image sensor.

14 Claims, 8 Drawing Sheets

IMAGE READING APPARATUS

RELATED APPLICATIONS

The present application is based on, and claims priority from Japanese Application Number 2010-097931, filed Apr. 21, 2010, the disclosure of which is hereby incorporated by reference herein in its entirety.

BACKGROUND OF THE INVENTION

1. Field of the Invention

The present invention relates to an image reading apparatus, and more particularly to an image reading apparatus that reduces of show-through.

2. Description of the Related Art

In an image reading apparatus, such as an apparatus disclosed in Japanese Laid-open Patent Publication No. 02-242390, a plate-like surface mirror is arranged on the back of a medium to be read (referred to as "medium" in Japanese Laid-open Patent Publication No. 02-242390). The apparatus disclosed in above patent is directed to read an image on a thin medium to be read clearly.

In the technique disclosed in Japanese Laid-open Patent Publication No. 02-242390, light diffused by the medium to be read or by each unit of the apparatus other than light irradiated from a light source is guided to the surface mirror. When the diffused light is transmitted through the medium to be read and guided to an image sensor, the image sensor also reads an image on the back of the medium to be read. Therefore, in this technique, there is a possibility that the image on the back of the medium to be read comes out on a surface (a read surface) of the medium to be read is read, that is, there is a possibility of so-called show-through.

SUMMARY OF THE INVENTION

It is an object of the present invention to at least partially solve the problems in the conventional technology.

An image reading apparatus according to one aspect of the invention includes a conveying path that conveys a reading medium having thereon an image to be read; a light source that irradiates light toward the conveying path, and irradiates the light toward the reading medium when the reading medium is conveyed; an image sensor that picks up an image on the reading medium based on reflected light of the light by the reading medium; and a light guiding unit that is provided on an opposite side to the light source with respect to the conveying path, the light guiding unit being configured to guide a part of the light directly to the image sensor when the reading medium is not conveyed to the light guiding unit, wherein the light guiding unit is configured to reduce disturbance light incident to the image sensor, among the light irradiated from the light source and light having transmitted through the reading medium, when the reading medium is fed to the image sensor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention will be explained below in detail with reference to the accompanying drawings. The present invention is not limited to embodiments explained below. In addition, constituent elements in the embodiments include those that can be easily assumed by persons skilled in the art or that are substantially equivalent. In the following embodiments, an image scanner is explained as an image reading apparatus; however, the present invention is not limited thereto, and the image reading apparatus can be any apparatus that reads a reading medium having thereon an image to be read, hereinafter the reading medium, by an image sensor, such as a copying machine, a fax machine, or a character or text recognition apparatus. In the following embodiments, an automatic paper feed scanner that moves an image sensor and the reading medium relative to each other by moving the reading medium with respect to the image sensor is explained as the image scanner; however, the present invention is not limited thereto, and it can be a flat bed scanner that moves an image sensor and the reading medium relative to each other by moving the image sensor with respect to the reading medium.

Figure 1:
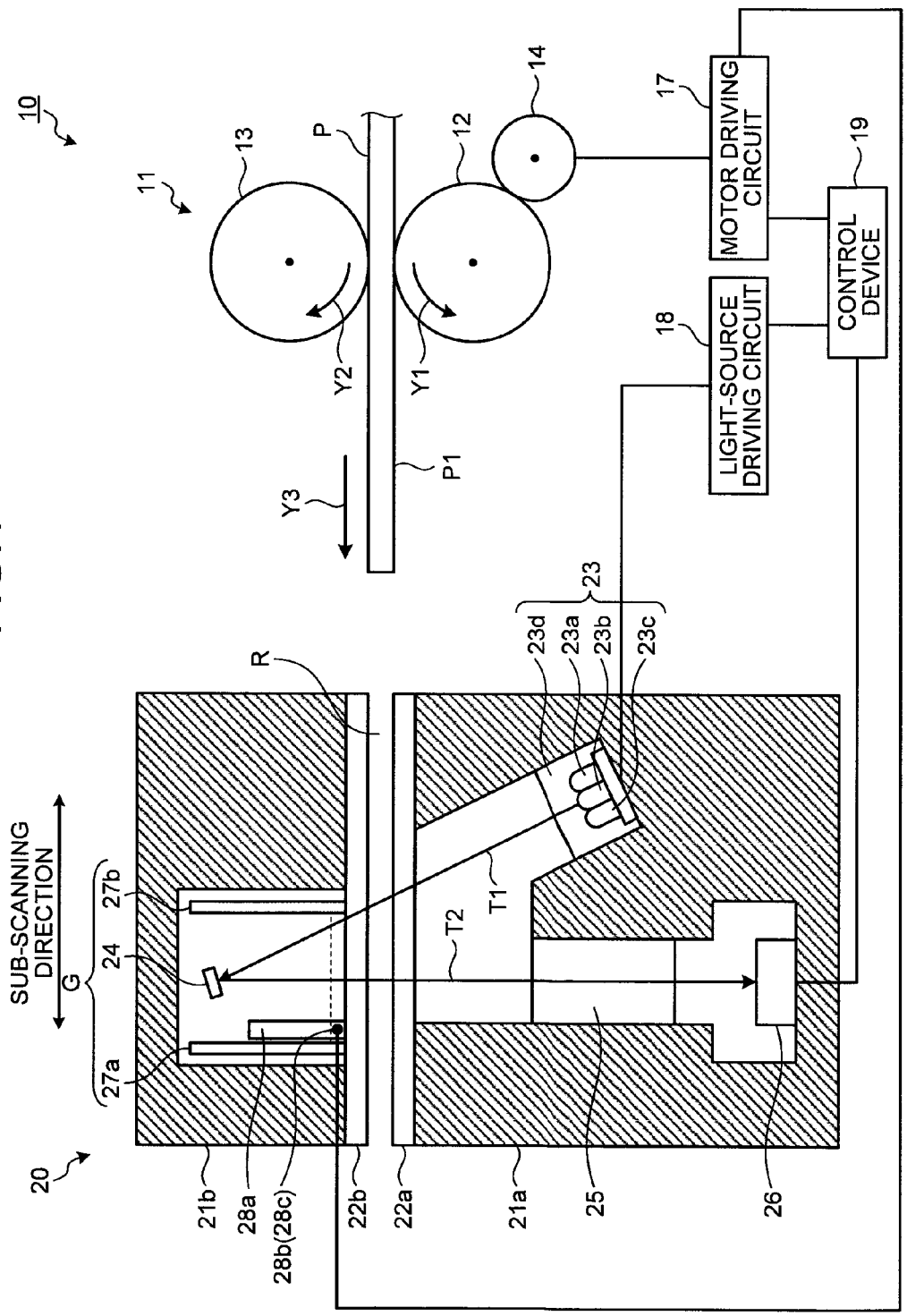
FIG. 1 is a schematic configuration example of an image reading apparatus according to a first embodiment of the present invention.

FIG. 1 is a schematic configuration example of an image reading apparatus according to a first embodiment of the present invention. In the first embodiment, it is assumed that the reading medium is an original P, and a reading target surface is a printing surface P1. An image reading apparatus 10 according to the first embodiment includes, as shown in FIG. 1, a conveying device 11, an image sensor unit 20, a motor driving circuit 17, a light-source driving circuit 18, and a control device 19. The conveying device 11 moves the image sensor unit 20 and the original P relative to each other. In the first embodiment, the conveying device 11 conveys or feeds the original P to the image sensor unit 20. The conveying device 11 includes conveying rollers 12 and 13, and a conveying roller motor 14. The conveying rollers 12 and 13 face each other and are rotatably supported. The conveying roller motor 14 provides a rotative force to the conveying roller 12 to rotate the conveying roller 12. When the conveying roller motor 14 rotates, the conveying roller 12 rotates in a direction of an arrow Y1. When the original P is guided to between the conveying rollers 12 and 13, the original P moves in a direction of an arrow Y3 due to the rotation of the conveying roller 12. The direction of the arrow Y3 is a direction where the original P approaches the conveying device 11. At this time, the conveying roller 13 rotates in a direction of an arrow Y2, which is a direction opposite to the direction of the arrow Y1. The conveying device 11 guides or feeds the original P to the image sensor unit 20 in this manner.

The image sensor unit 20 reads the printing surface P1 of the original P conveyed by the conveying device 11. Specifically, the image sensor unit 20 reads the original P in a main scanning direction. The main scanning direction is a direction parallel to the printing surface P1 of the original P and orthogonal to a conveyance direction of the original P. The main scanning direction is also a direction orthogonal to a paper surface in FIG. 1. The image sensor unit 20 is fixed to a casing (not shown) of the image reading apparatus 10. The image sensor unit 20 includes a first frame 21a, a second frame 21b, a first transmission plate 22a, a second transmission plate 22b, a light source unit 23, a lens 25, an image sensor 26, a white reference plate 28a as a color reference unit, a rotation shaft 28b, a white reference-plate driving motor 28c, and a light guiding unit G.

The light guiding unit G is provided on the opposite side to the light source unit 23 with respect to a conveying path R where the original P is conveyed, and when the original P is not in the conveying path R, the light guiding unit G causes light irradiated from the light source unit 23, which is not irradiated to the original P, to directly enter into the image sensor 26. The light guiding unit G also reduces light incident to the image sensor 26, among light irradiated from the light source unit 23 and having transmitted through the original P, at the time of picking up or reading an image on the medium by the image sensor 26. Specifically, the light guiding unit G includes a light reflector 24, and a first masking shield 27a and a second masking shield 27b as a shielding unit.

The first frame 21a and the second frame 21b support other constituent elements or components of the image sensor unit 20. The second frame 21b corresponds to a conventional backing member. The first transmission plate 22a and the second transmission plate 22b are plate-like members that transmit light. The first transmission plate 22a and the second transmission plate 22b are, for example, glass plates. The first transmission plate 22a is provided on the first frame 21a. The second transmission plate 22b is provided on the second frame 21b. The first transmission plate 22a and the second transmission plate 22b are provided with a gap therebetween and parallel to each other. Accordingly, in the image reading apparatus 10, a conveyance path R in which the original P can travel is formed between the first transmission plate 22a and the second transmission plate 22b. The original P travels in the conveyance path R, while being supported by the first transmission plate 22a and the second transmission plate 22b.

The light source unit 23 is provided in the first frame 21a. The light source unit 23 irradiates the light T1 toward the conveyance path R. When there is the original P on the conveyance path R, the light source unit 23 irradiates the light T1 toward the original P. The light source unit 23 includes an R-light source 23a, a G-light source 23b, a B-light source 23c, and a prism 23d. The R-light source 23a emits red light when turned on. The G-light source 23b emits green light when turned on. The B-light source 23c emits blue light when turned on. The R-light source 23a, the G-light source 23b, and the B-light source 23c (hereinafter, "respective light sources 23a to 23c") are light emitting diodes (LEDs), for example. The light-source driving circuit 18 described later drives the respective light sources 23a to 23c. The prism 23d is provided between the respective light sources 23a to 23c and the conveyance path R. The prism 23d is for uniformly guiding the light T1 emitted by the respective light sources 23a to 23c in the main scanning direction of the conveyance path R. When the original P is in the conveyance path R, the light T1 in respective colors irradiated by the respective light sources 23a to 23c is guided to the first transmission plate 22a via the prism 23d to transmit through the first transmission plate 22a, and uniformly guided in the main scanning direction of the original P.

The light reflector 24 is a member that totally reflects incident light. That is, the light reflector 24 causes incident light to directly enter into the image sensor 26. "Directly" referred to herein includes a case that a mirror intervenes in an optical path between the light reflector 24 and the image sensor 26. In the first embodiment, the light reflector 24 is, for example, a plate-like mirror. The light reflector 24 is provided in the second frame 21b which is on the opposite side to the light source unit 23, with respect to the conveyance path R. The light reflector 24 is provided so that the original P can be present between the light source unit 23 and the light reflector 24. The light reflector 24 is provided at a position where the light T1 irradiated from the light source unit 23 can be an incident light. That is, the light reflector 24 is provided at a position where, when there is no original P in the conveyance path R, the light irradiated from the light source unit 23 directly enters as the incident light. The light reflector 24 reflects the incident light T1 irradiated from the light source unit 23 toward the conveyance path R. Light reflected by the light reflector 24 is assumed here as the light T2.

The lens 25 and the image sensor 26 are provided in the first frame 21a, which is on the same side as the light source unit 23 of the conveyance path R. The lens 25 is provided between the first transmission plate 22a and the image sensor 26. The light T2 reflected by the light reflector 24 and light reflected by the original P are guided to the lens 25. The lens 25 causes guided light to enter into the image sensor 26. The lens 25 includes, for example, a rod lens array. The lens 25 transmits light from the respective light sources 23a to 23c reflected by the printing surface P1 of the original P to form an erected image of the printing surface P1 on a line sensor of the image sensor 26 at the same magnification.

The image sensor 26 picks up the image of the original P based on light reflected by the original P after being irradiated from the light source unit 23. The image sensor 26 reads the printing surface P1 of the original P conveyed by the conveying device 11. In the image sensor 26, sensor elements (image pick-up devices) (not shown) are linearly arranged. In the first embodiment, the sensor elements are arranged in one line in the main scanning direction of the original P present in the conveyance path R. The respective sensor elements generate element data corresponding to light entering via the lens 25 for each exposure. That is, for each exposure, the image sensor 26 generates line data including the element data generated corresponding to each sensor element. Accordingly, in the image sensor 26, the sensor elements linearly arranged in one line read the original P in the main scanning direction.

The first masking shield 27a and the second masking shield 27b are provided between the light reflector 24 and the image sensor 26 in a direction orthogonal to the original P, to reduce an irradiance of light irradiated from the light source unit 23, having transmitted through the original P, and reflected by the light reflector 24, into the image sensor 26. The first masking shield 27a and the second masking shield 27b reduce the irradiance of light having transmitted through the original P into the light reflector 24.

Specifically, the first masking shield 27a and the second masking shield 27b are provided in the second frame 21b on the same side of the conveyance path R as the light reflector 24. The first masking shield 27a and the second masking shield 27b are plate-like members extending in the main scanning direction. The first masking shield 27a and the second masking shield 27b are provided not to be parallel to the second transmission plate 22b, for example, to be orthogonal to the second transmission plate 22b. The first masking shield 27a and the second masking shield 27b are supported, for example, on an opposite surface of the second transmission plate 22b to the conveyance path R.

The light reflector 24 is provided between the first masking shield 27a and the second masking shield 27b in a sub-scanning direction. The sub-scanning direction is a direction parallel to the conveyance path R, or the original P, and orthogonal to the main scanning direction. The first masking shield 27a is provided on the side of the lens 25 and the image sensor 26 in the sub-scanning direction, and the second masking shield 27b is provided on the light source unit 23 side in the sub-scanning direction. The first masking shield 27a and the second masking shield 27b are provided not to block the lights T1 and T2. Accordingly, the first masking shield 27a and the second masking shield 27b reduce light other than the lights T1 and T2 and entering into the light reflector 24. In the first embodiment, the image sensor unit 20 includes two masking shields such as the first masking shield 27a and the second masking shield 27b; however, the image sensor unit 20 can include, for example, a box-like shielding member having an opening in a portion facing the second transmission plate 22b. The box-like shielding member is provided to cover the light reflector 24.

The white reference plate 28a is provided in the second frame 21b on the same side of the conveyance path R as the light reflector 24. The white reference plate 28a is a plate-like member extending in the main scanning direction. The white reference plate 28a is provided between the first masking shield 27a and the second masking shield 27b, and between the light reflector 24 and the second transmission plate 22b. The white reference plate 28a is painted white, or a white sheet is attached to the surface thereof. The white reference plate 28a acquires a rotation force from the white-reference-plate driving motor 28c and can turn about the rotation shaft 28b. The rotation shaft 28b is, for example, parallel to the main scanning direction. The white reference plate 28a turns about the rotation shaft 28b toward a direction approaching the second transmission plate 22b, thereby enabling to block a space between the first masking shield 27a and the second masking shield 27b. Accordingly, the white reference plate 28a blocks the light T1 entering into the light reflector 24.

The white reference plate 28a turns about the rotation shaft 28b in a direction away from the second transmission plate 22b, enabling to make the space between the first masking shield 27a and the second masking shield 27b open. Accordingly, the white reference plate 28a does not block the light T1 entering into the light reflector 24 and the light T2 reflected by the light reflector 24. The light T1 blocked by the white reference plate 28a is reflected by a white surface of the white reference plate 28a and guided to the image sensor 26 via the lens 25. The image sensor 26 designates light entering at this time as a reference of white color. The image sensor 26 corrects a difference in tone of the images respectively read by the sensor elements based on the reference of white color. That is, when correcting the tone of the image read by the image sensor 26, the white reference plate 28a turns in the direction approaching the second transmission plate 22b to block the space between the first masking shield 27a and the second masking shield 27b. When correction of the tone of the image read by the image sensor 26 is complete and the image sensor unit 20 reads the original P, the white reference plate 28a turns to approach the first masking shield 27a to make the space between the first masking shield 27a and the second masking shield 27b open.

The motor driving circuit 17 is a circuit (an electronic device) for driving the conveying roller motor 14 and driving the white-reference-plate driving motor 28c. Specifically, the motor driving circuit 17 adjusts the timing for rotating the conveying roller motor 14 and an angle for rotating the conveying roller motor 14. As a result, the motor driving circuit 17 adjusts the timing for rotating the conveying roller 12 and an angle for rotating the conveying roller 12. That is, the motor driving circuit 17 adjusts the timing for conveying the original P and a conveyance amount of the original P. The light-source driving circuit 18 is a circuit (an electronic device) for driving the respective light sources 23a to 23c. Specifically, the light-source driving circuit 18 adjusts the turning on/off timing of the respective light sources 23a to 23c.

The control device 19 is a computer and includes an arithmetic unit, a storage unit, and an input/output. The control device 19 is electrically connected to the motor driving circuit 17, the light-source driving circuit 18, and the image sensor 26. Accordingly, the control device 19 adjusts the timing for conveying the original P and the conveyance amount of the original P by means of the motor driving circuit 17. The control device 19 adjusts the turning on/off timing of the respective light sources 23a to 23c by means of the light-source driving circuit 18. The control device 19 causes the respective sensor elements of the image sensor 26 to be exposed at the time of turning on the respective light sources 23a to 23c. That is, the control device 19 causes the respective sensor elements to be exposed in a control period during which the respective light sources 23a to 23c are turned on. Accordingly, the respective sensor elements generate element data corresponding to the respective colors of R, G, and B (Red, Green, and Blue), that is, R data, G data, and B data for every lighting-up of the respective light sources 23a to 23c. Accordingly, the image sensor 26 generates R line data, G line data, and B line data, which compose RGB line data corresponding to the respective RGB colors. The control device 19 acquires RGB line data generated by the image sensor 26.

The control device 19 can detect an edge of the original P. At the time of reading the original P, the white reference plate 28a is opened (the space between the first masking shield 27a and the second masking shield 27b is open). Accordingly, the light T1 irradiated by the light source unit 23 enters into the light reflector 24, and is reflected by the light reflector 24. The light T2 reflected by the light reflector 24 is guided to the image sensor 26 via the lens 25. At this time, when the original P is not at a position capable of blocking the light T2, the light T2 is directly guided to the lens 25. On the other hand, when the original P is at the position capable of blocking the light T2, the light T2 transmits through the original P and is guided to the lens 25. Accordingly, an amount of light to be guided to the lens 25 changes whether the original P is at the position capable of blocking the light T2. The control device 19 can detect the edge of the original P based on a difference in the amount of light. A detailed configuration of the image sensor unit 20 is explained next.

Figure 2:
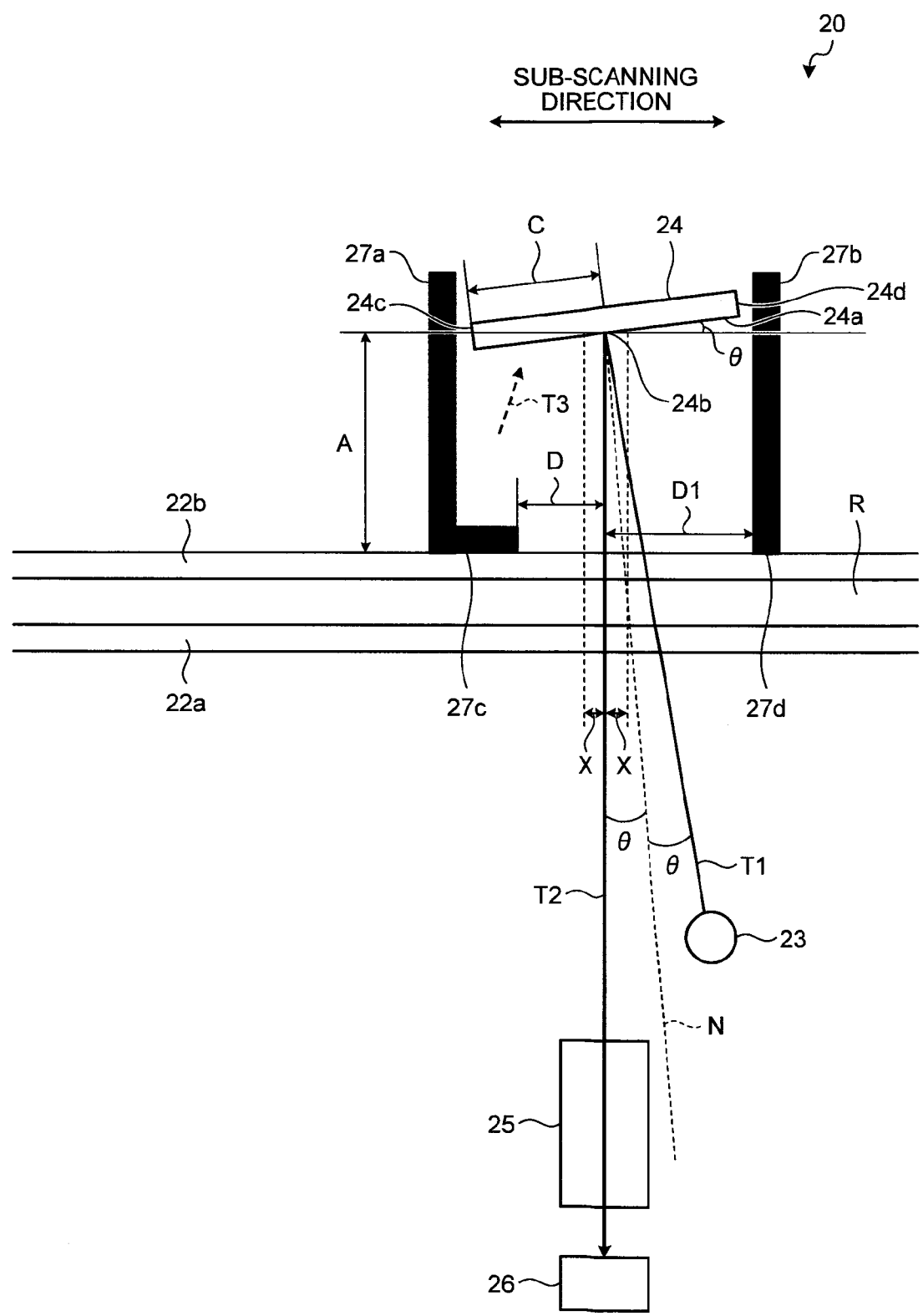
FIG. 2 is a schematic diagram for explaining a configuration of an image sensor unit according to the first embodiment.

FIG. 2 is a schematic diagram for explaining the configuration of the image sensor unit according to the first embodiment. The light reflector 24 includes a mirror surface 24a and an incident portion 24b. It is not necessary that all parts or all portion of the light reflector 24 need to be a mirror. At least a part of the light reflector 24 needs only to be the mirror surface 24a. The mirror surface 24a functions as a reflecting unit. A specific portion of the mirror surface 24a is a surface facing the conveyance path R. Further, the entire surface of the light reflector 24 facing the conveyance path R does not necessarily need to be the mirror surface 24a. At least a part of the light reflector 24 into which the light T1 enters needs only to be the mirror surface 24a. That is, so long as the light source unit 23 can irradiate the light T1 without an error, or accurately, the size of the mirror surface portion of the light reflector 24 in the sub-scanning direction can have a value larger than 0. However, in the case of the image sensor unit 20 actually manufactured, the image sensor unit 20 includes errors such as an assembly error of the light source unit 23 or a manufacturing error. In the first embodiment, therefore, the entire surface of the light reflector 24 facing the conveyance path R is designed to be a mirror (the mirror surface 24a). A part of the mirror surface 24a where the light T1 enters is designated as the incident portion 24b. A line intersecting with the incident portion 24b and orthogonal to the mirror surface 24a is designated as a normal line N.

In FIG. 2, for the sake of explanation, the size of the light reflector 24 is shown slightly larger for improving visualization. Actually, however, the light reflector 24 is formed smaller than the one schematically shown in FIG. 2 for satisfying an equation described later. A size C shown in FIG. 2 is a size of the mirror surface 24a. Specifically, the size C is a size from the incident portion 24b to an end portion 24c. The end portion 24c is an end of the mirror surface 24a in a plane including the lights T1 and T2 (a plain including FIG. 2). The mirror surface 24a has two end portions, that is, the end portion 24c and an end portion 24d in the plane. The end portion 24c is an end of the mirror surface 24a on the opposite side to the light source unit 23 (on the same side as the lens 25 and the image sensor 26), with respect to the normal line N. That is, the end portion 24c is an end of the light reflector 24 on the first masking shield 27a side.

A distance D is a distance between an end portion 27c of the first masking shield 27a on the conveyance path R side and the light T2 in the plane (in the plain including FIG. 2). In the first embodiment, a portion of the first masking shield 27a for supporting the rotation shaft 28b is provided at the end portion 27c on the second transmission plate 22b side. Accordingly, the end portion 27c of the first masking shield 27a on the second transmission plate 22b side is formed in a shape having a protrusion toward the second masking shield 27b in the sub-scanning direction (substantially in an L-shape). In the first embodiment, the distance D is a distance from the light T2 to the protrusion. The reason for providing the protrusion is not limited to supporting the rotation shaft 28b. For example, the protrusion can be provided for decreasing an area of the gap (an opening) between the first masking shield 27a and the second masking shield 27b.

A distance D1 is a distance between an end portion 27d of the second masking shield 27b on the conveyance path R side and the light T2 in the plane (in the plain including FIG. 2). A distance A is a distance from the incident portion 24b to the second transmission plate 22b. An incident angle θ is an angle of the light T1 entering into the incident portion 24b. That is, the incident angle θ is a narrow angle formed between a path of the light T1 and the normal line N. The angle θ matches a reflection angle at the incident portion 24b (a narrow angle between a path of the light T2 and the normal line N), and an angle of the light reflector 24 (the incident portion 24b) inclined with respect to the image sensor 26 or the conveyance path R. An error-assuming size X is a size of deviation of the path of the light T2 in the sub-scanning direction assumed to be caused due to a manufacturing error. When an error tolerance is 0 (zero) or approximated to be 0, the error-assuming size X can be handled as 0. A condition or an equation to be satisfied by respective values of the distance A, the size C, the distance D, the distance D1, the error-assuming size X, and the incident angle θ is explained next.

The distance A and the incident angle θ satisfy the following equation (1).

$$A \cdot \tan(2\theta) > X \tag{1}$$

According to the equation (1), in the light reflector 24, the position of the incident portion 24b is set so that the distance A becomes larger than a value obtained by dividing the error-assuming size X by $\tan(2\theta)$. When the distance A and the incident angle θ do not satisfy the equation (1), the light reflector 24 cannot guide light to the image sensor 26.

The distance A, the distance D1, the error-assuming size X, and the incident angle θ satisfy the following equation (2).

$$D1 > A \cdot \tan(2\theta) + X \tag{2}$$

The second masking shield 27b does not block the light T1 when the equation (2) is satisfied. Accordingly, the light T1 enters into the incident portion 24b.

The distance A, the size C, the error-assuming size X, and the incident angle θ are set to satisfy the following equation (3) or an equation (4) explained later.

$$X < C < A \cdot \tan(2\theta) / [\cos(\theta) + \sin(\theta) \cdot \tan(\theta)] \tag{3}$$

In the mirror surface 24a, a range of a value that can be taken by the size C is specified when the equation (3) is satisfied. As the size C increases, a possibility that light other than the light T1 enters into the mirror surface 24a increases. Light other than the light T1 is, for example, light diffused by the original P or light diffused by the respective members of the image sensor unit 20. Light other than the light T1 and the light T2 is designated hereinafter as disturbance light T3. When such light enters into the mirror surface 24a, the light reflector 24 may guide the disturbance light T3 to the image sensor 26. If the disturbance light T3 is guided to the image sensor 26, the image sensor unit picks up an image other than the printing surface P1 (for example, an image formed on the back opposite to the printing surface P1). Such a phenomenon that an image formed on the back of the original P comes out in the image of the printing surface P1 is referred to as show-through. If show-through occurs, the image read by the image sensor unit deteriorates, that is, accuracy of reading of the image sensor unit decreases.

However, in the image sensor unit 20 according to the first embodiment, the range of the value that can be taken by the size C is specified by the equation (3) mentioned above. Specifically, the size C has a value smaller than $$A \cdot \tan(2\theta) / [\cos(\theta) + \sin(\theta) \cdot \tan(\theta)].$$

Therefore, the image sensor unit 20 can reduce the disturbance light T3 incident to the mirror surface 24a, if the distance A, the size C, the error-assuming size X, and the incident angle θ satisfy the equation (3). As a result, the image sensor unit 20 can reduce show-through. When the size C is larger than $$A \cdot \tan(2\theta) / [\cos(\theta) + \sin(\theta) \cdot \tan(\theta)],$$

in the image reading apparatus 10, the strongest light of the light T2 reflected by the light reflector 24 does not enter into a line to be read (hereinafter, "read line").

The image sensor unit 20 does not need to include the first masking shield 27a and the second masking shield 27b. The image sensor unit 20 can reduce show-through when the distance A, the size C, the error-assuming size X, and the incident angle θ satisfy the equation (3), without including the first masking shield 27a and the second masking shield 27b. However, it is more preferable that the image sensor unit 20 includes the first masking shield 27a and the second masking shield 27b and the size C, the distance A, and the error-assuming size X satisfy the equation (3). Accordingly, the image sensor unit 20 can preferably reduce the disturbance light T3 incident to the mirror surface 24a. As a result, the image sensor unit 20 can favorably reduce show-through. As described above, because the error-assuming size X is a value that can take 0, the above equation (3) can be replaced by $$0<C<A\cdot\tan(2\theta)/[\cos(\theta)+\sin(\theta)\cdot\tan(\theta)].$$

When the size C, the distance D1, and the incident angle θ satisfy $C\cdot\cos(\theta)>D1$, the distance A, the distance D, the error-assuming size X, and the incident angle θ are set to satisfy the following equation (4).

$$D<A\cdot\tan(2\theta)-X/(1-\tan(\theta)\cdot\tan(2\theta)) \quad (4)$$

As described above, since the error-assuming size X is a value that can take 0, the equation (4) can be replaced with the following equation (4'). When the distance A is the shortest distance between the mirror surface 24a and the second transmission plate 22b, the equation (4) can be replaced with the following equation (4").

$$D<A\cdot\tan(2\theta)/(1-\tan(\theta)\cdot\tan(2\theta)) \quad (4')$$

$$D<A\cdot\tan(2\theta) \quad (4")$$

The first masking shield 27a approaches the incident portion 24b in the sub-scanning direction, as the distance D decreases. Accordingly, because a space between the light T2 and the first masking shield 27a in the sub-scanning direction becomes narrow, the image sensor unit 20 can reduce the disturbance light T3 entering from the gap. Accordingly, it is desired that the distance D is as small as possible. An upper limit of the distance D capable of reducing the disturbance light T3 incident to the mirror surface 24a is derived from the equation (4) or (4'). For example, even if the distance A, the size C, the error-assuming size X, and the incident angle θ do not satisfy the equation (3), the distance D can be a distance where the first masking shield 27a can sufficiently reduce the disturbance light T3 incident to the mirror surface 24a, by setting the distance A, the distance D, the error-assuming size X, and the incident angle θ to satisfy the equation (4) mentioned above. That is, when the size C, the distance D1, and the incident angle θ satisfy the equation (4) or (4'), the disturbance light T3 having passed through in close proximity to the end portion 27c of the first masking shield 27a does not enter into the read line. Accordingly, the image sensor unit 20 can reduce the disturbance light T3 incident to the mirror surface 24a. Therefore, the image sensor unit 20 can reduce show-through.

As described above, in the first embodiment, the image sensor unit 20 includes the first masking shield 27a and the second masking shield 27b, and the distance A, the size C, the error-assuming size X, and the incident angle θ satisfy the equation (3), or the distance A, the distance D, the error-assuming size X, and the incident angle θ satisfy the equation (4) or (4'). However, the image sensor unit 20 is not limited thereto. The image sensor unit 20 needs only to satisfy at least one of: that the image sensor unit 20 includes the first masking shield 27a and the second masking shield 27b; that the distance A, the size C, the error-assuming size X, and the incident angle θ satisfy the equation (3); and that the distance A, the distance D, the error-assuming size X, and the incident angle θ satisfy the equation (4) or (4'). In any case, the image sensor unit 20 can reduce the disturbance light T3 incident to the light reflector 24. Accordingly, the image sensor unit 20 can reduce show-through.

Figure 3:
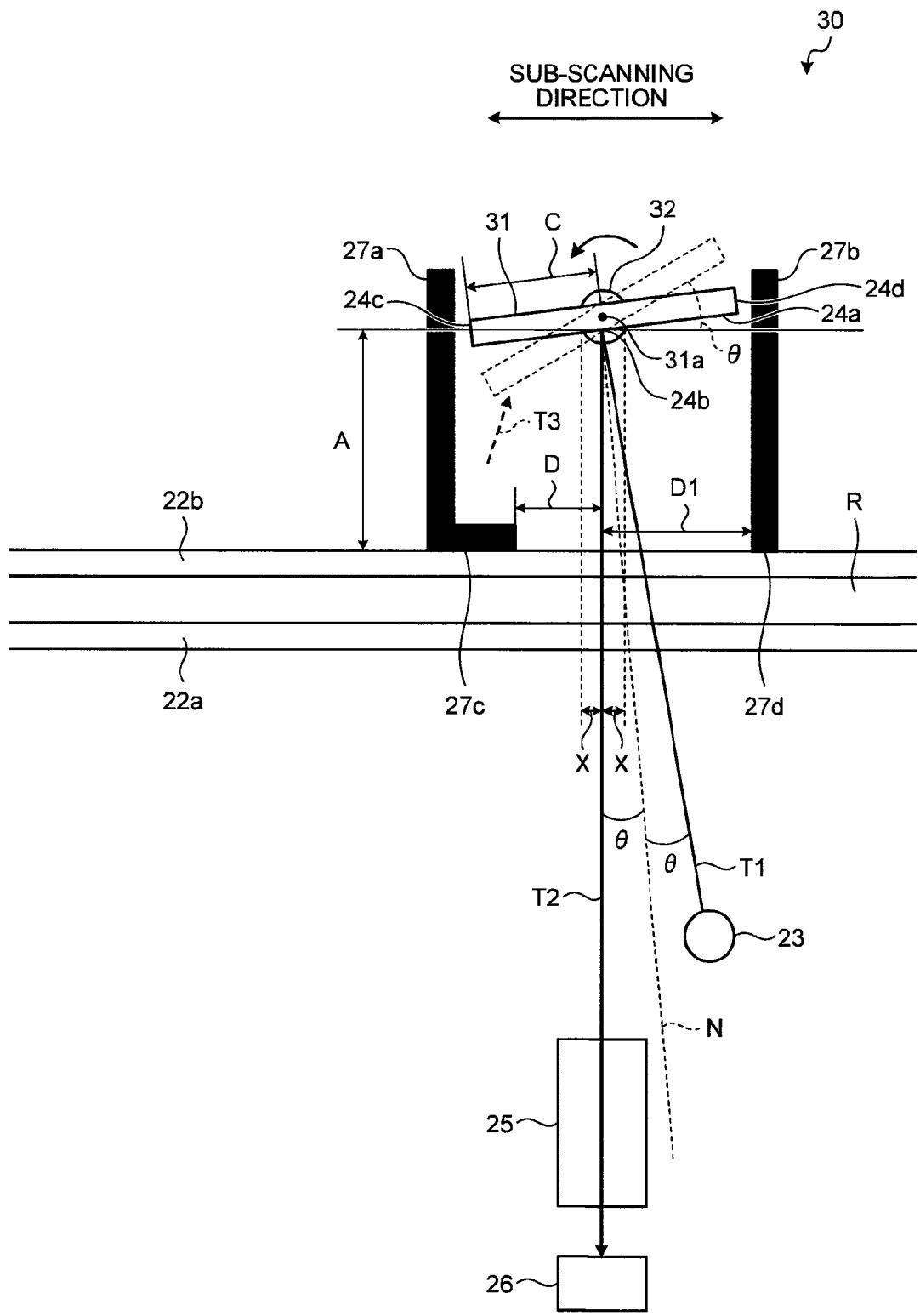
FIG. 3 is a schematic diagram for explaining a configuration of an image sensor unit according to a second embodiment of the present invention.

FIG. 3 is a schematic diagram for explaining the configuration of the image sensor unit according to a second embodiment of the present invention. In an image sensor unit 30 according to the second embodiment, a part of the image sensor unit 20 according to the first embodiment shown in FIG. 2 is changed. In the image sensor unit 30, constituent elements identical to those in the image sensor unit 20 are denoted by the same reference numerals and explanations thereof will be omitted. The image sensor unit 30 shown in FIG. 3 includes a light reflector 31 and a light-reflector turning motor 32. The image sensor unit 30 has a feature in that the light reflector 31 turns.

The light reflector 31 is supported so that it can turn about a rotation shaft 31a. The rotation shaft 31a is provided along the main scanning direction. The light-reflector turning motor 32 provides a turning force to the light reflector 31. Accordingly, when the light-reflector turning motor 32 is driven, the light reflector 31 turns about the rotation shaft 31a. When the light reflector 31 turns about the rotation shaft 31a, an inclination angle thereof with respect to the image sensor 26, which coincides with the incident angle θ, changes. The light-reflector turning motor 32 is electrically connected to the motor driving circuit 17 shown in FIG. 1. Accordingly, the control device 19 can control drive of the light-reflector turning motor 32 by means of the motor driving circuit 17. Specifically, the control device 19 adjusts a rotation angle of the light-reflector turning motor 32, that is, an angle to which the light reflector 31 is turned.

According to the configuration, for example, when there is a manufacturing error, the image sensor unit 30 can correct the error by turning the light reflector 31. Further, the image sensor unit 30 can adjust the inclination angle of the light reflector 31 with respect to the image sensor 26. The inclination angle of the light reflector 31 with respect to the image sensor 26 coincides with the incident angle θ. That is, the image sensor unit 30 can adjust the incident angle θ. Accordingly, for example, when a user tries to further reduce show-through, the image sensor unit 30 can adjust the incident angle θ in a range that the distance A, the size C, the error-assuming size X, and the incident angle θ satisfy the equation (3) or that the distance A, the distance D, the error-assuming size X, and the incident angle θ satisfy the equation (4) or (4'). For example, the image sensor unit 30 adjusts the incident angle θ based on the amount of light guided to the image sensor 26 in a state without the original P in the conveyance path R. In this case, for example, the image sensor unit 30 may adjust the incident angle θ so as not to guide the light T2 to the image sensor 26. Accordingly, the image sensor unit 30 can reduce the disturbance light T3 incident to the mirror surface 24a. As a result, there is improved possibility that the image sensor unit 30 can reduce show-through.

In the second embodiment, the image sensor unit 30 includes the first masking shield 27a and the second masking shield 27b, and the distance A, the size C, the error-assuming size X, and the incident angle θ satisfy the equation (3), or the distance A, the distance D, the error-assuming size X, and the incident angle θ satisfy the equation (4) or (4'). However, the image sensor unit 30 is not limited thereto. The image sensor unit 30 needs only to satisfy at least one of: that the image sensor unit 30 includes the first masking shield 27a and the second masking shield 27b; that the distance A, the size C, the error-assuming size X, and the incident angle θ satisfy the equation (3); and that the distance A, the distance D, the error-assuming size X, and the incident angle θ satisfy the equation (4) or (4'). In any case, the image sensor unit 20 can reduce the disturbance light T3 incident to the light reflector 31. Accordingly, the image sensor unit 30 can reduce show-through.

Figure 4:
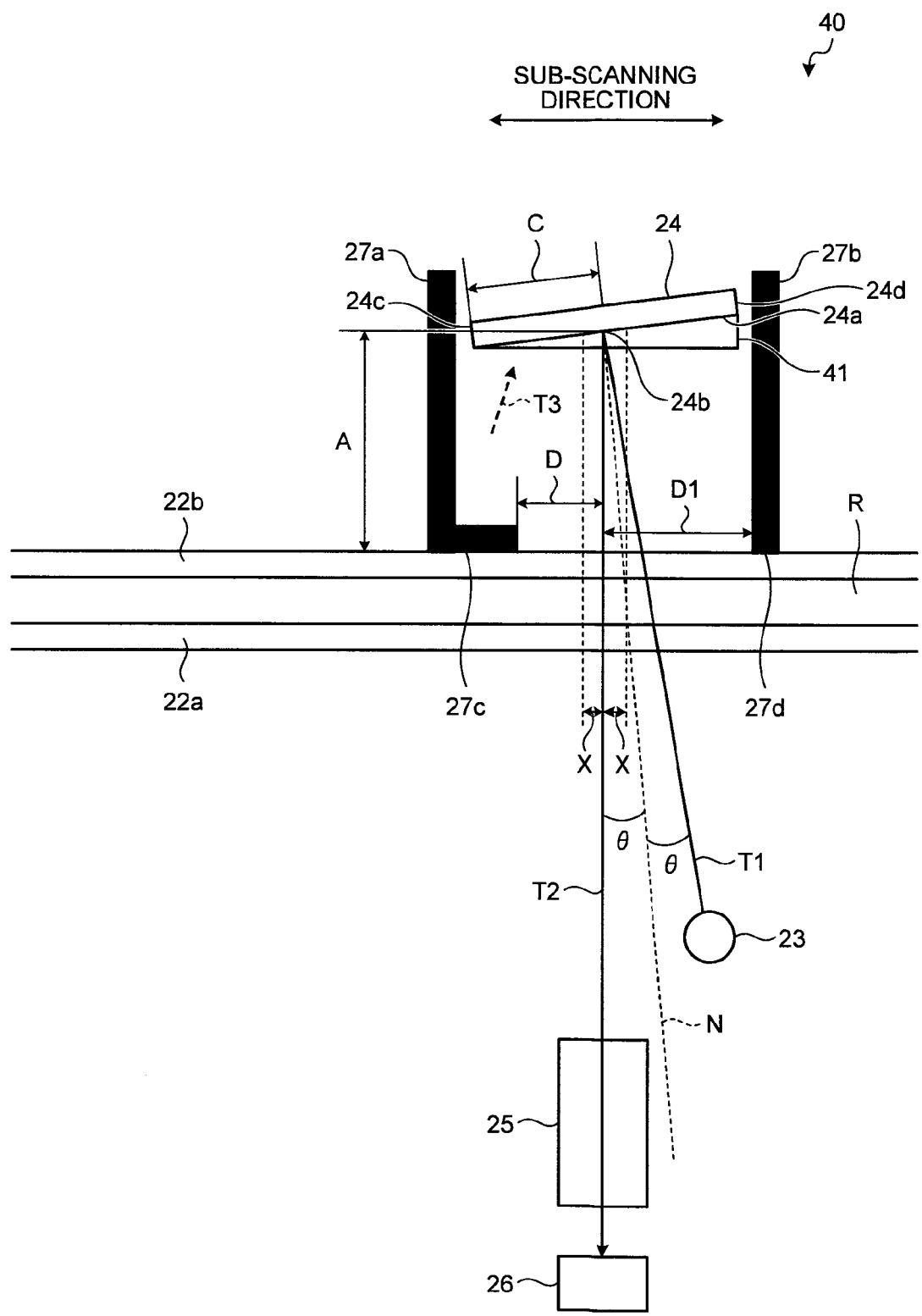
FIG. 4 is a schematic diagram for explaining a configuration of an image sensor unit according to a third embodiment of the present invention.
Figure 5:
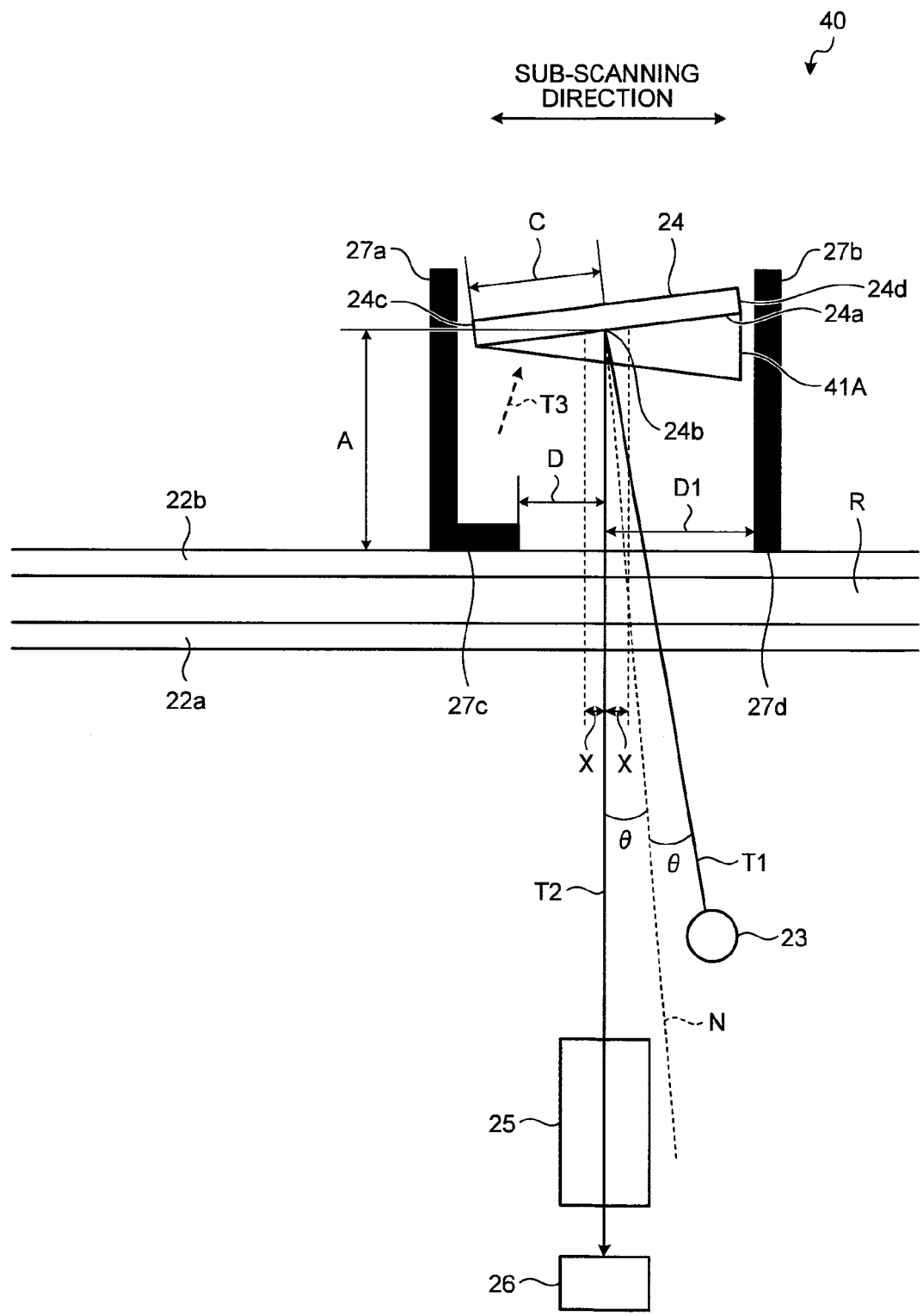
FIG. 5 is a schematic diagram for explaining a configuration of another image sensor unit according to the third embodiment.

FIG. 4 is a schematic diagram for explaining the configuration of the image sensor unit according to a third embodiment of the present invention. FIG. 5 is a schematic diagram for explaining the configuration of another image sensor unit according to the third embodiment. In an image sensor unit 40 according to the third embodiment, a light reflector prism 41 shown in FIG. 4 is added to the image sensor unit 20 according to the first embodiment shown in FIG. 2. In the image sensor unit 40, constituent elements identical to those in the image sensor unit 20 are denoted by the same reference numerals and explanations thereof will be omitted. The light reflector prism 41 is provided between the light reflector 24 and the conveyance path R. Accordingly, when there is the original P in the conveyance path R, the light reflector prism 41 is provided between the light reflector 24 and the original P. Specifically, the light reflector prism 41 is fitted to the light reflector 24 to come in contact with the mirror surface 24a of the light reflector 24.

A surface of the light reflector prism 41, facing the conveyance path R, is formed parallel to the conveyance path R as shown in FIG. 4. However, the light reflector prism 41 is not limited to the shape shown in FIG. 4. In the image sensor unit 40, the surface facing the conveyance path R can be a shape inclined with respect to the conveyance path R, as in a light reflector prism 41A shown in FIG. 5. The light reflector prism 41 needs only to have a shape capable of guiding the light T1 to the incident portion 24b and guiding the light T2 to the lens 25.

Because the image sensor unit 40 includes the light reflector prism 41, the disturbance light T3 is refracted by the light reflector prism 41 or 41A. For example, when the image sensor unit does not include the light reflector prism 41, the disturbance light T3 is guided to the lens 25. However, because the image sensor unit 40 includes the light reflector prism 41, the disturbance light T3 is refracted by the light reflector prism 41. Accordingly, the image sensor unit 40 can reduce the disturbance light T3 guided to the lens 25. As a result, the image sensor unit 40 can reduce show-through.

In the third embodiment, the image sensor unit 40 includes the first masking shield 27a and the second masking shield 27b, and the distance A, the size C, the error-assuming size X, and the incident angle θ satisfy the equation (3) or the distance A, the distance D, the error-assuming size X, and the incident angle θ satisfy the equation (4) or (4'). However, the image sensor unit 40 is not limited thereto. The image sensor unit 40 can have such a configuration that the first masking shield 27a and the second masking shield 27b are omitted, the distance A, the size C, the error-assuming size X, and the incident angle θ may not satisfy the equation (3), and the distance A, the distance D, the error-assuming size X, and the incident angle θ may not satisfy the equation (4) or (4'). Even in this case, in the image sensor unit 40, the light reflector prism 41 can sufficiently reduce the disturbance light T3 guided to the lens 25. As a result, the image sensor unit 40 can reduce show-through.

Figure 6:
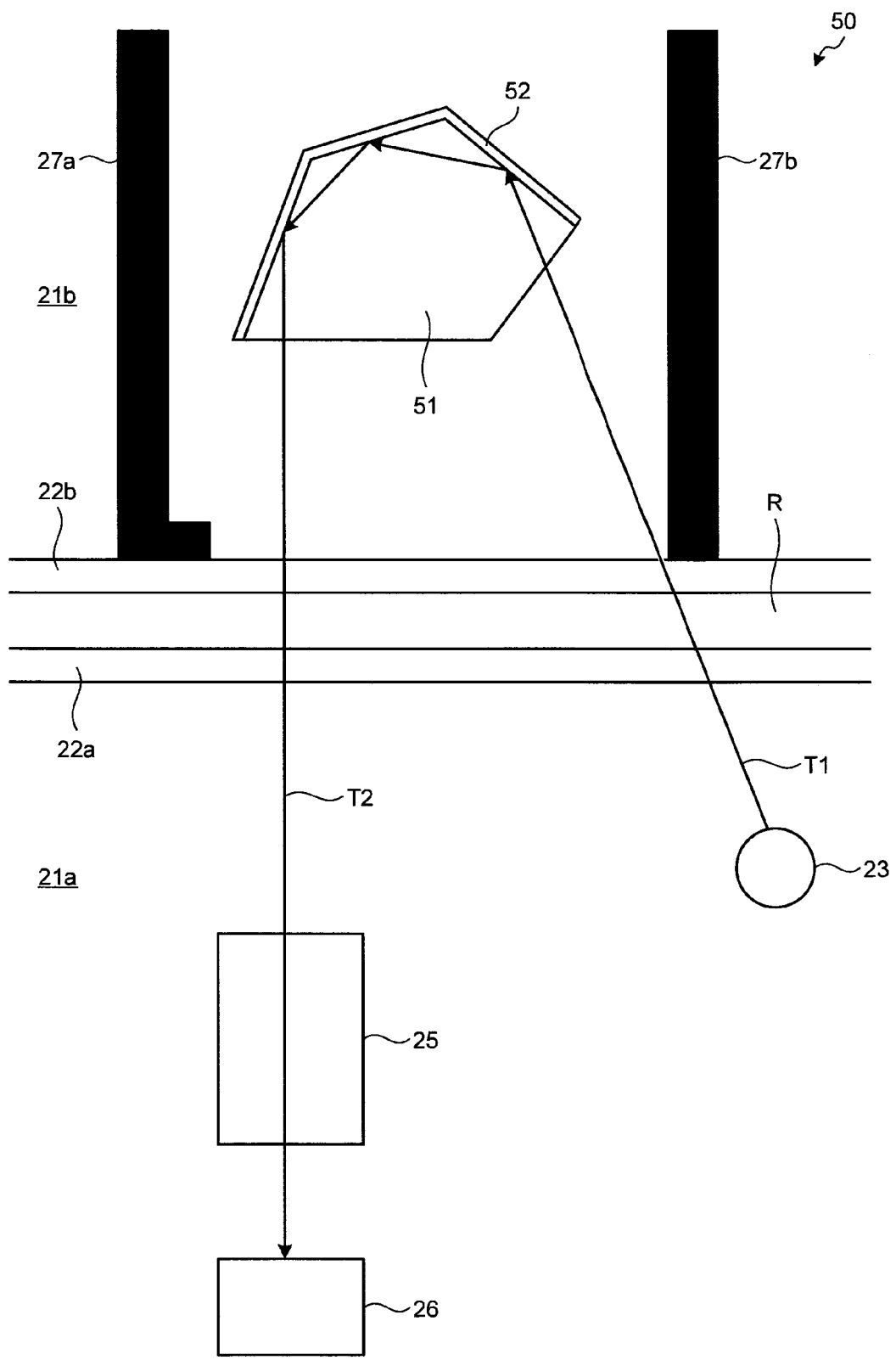
FIG. 6 is a schematic diagram for explaining a reflecting unit according to a fourth embodiment of the present invention.

FIG. 6 is a schematic diagram for explaining a reflecting unit according to a fourth embodiment of the present invention. An image sensor unit 50 according to the fourth embodiment includes a prism 51 as the reflecting unit, instead of the light reflector 24 according to the first embodiment shown in FIG. 2. In the image sensor unit 50, constituent elements identical to those in the image sensor unit 20 are denoted by the same reference numerals and explanations thereof will be omitted. The prism 51 is provided in the second frame 21b on the opposite side to the light source unit 23, with respect to the conveyance path R. The prism 51 is provided at a position where the light T1 irradiated from the light source unit 23 can enter. That is, when there is no original P on the conveyance path R, the prism 51 is provided at a position where light irradiated from the light source unit 23 directly enters.

The prism 51 reflects or substantially totally reflects the light T1 on a plurality of mirror surfaces 52, and eventually guides the light T2 to the lens 25. Accordingly, the prism 51 has the same effect as that of a combination of the light reflector prism 41 and the light reflector 24 shown in FIG. 4 and a combination of the light reflector prism 41A and the light reflector 24 shown in FIG. 5 due to the same reason. The image sensor unit 50 according to the fourth embodiment can omit the light reflector 24, as an effect different from that of the image sensor unit 40 according to the third embodiment. Accordingly, the image sensor unit 50 can reduce the number of parts. As a result, the image sensor unit 50 can reduce the cost required for manufacturing the image sensor unit and workload required for manufacturing the image sensor unit. The image sensor unit 50 can guide only specific light of the light T1 from the light source unit 23 to the image sensor 26 by the prism 51.

In the fourth embodiment, the image sensor unit 50 includes the first masking shield 27a and the second masking shield 27b. However, the image sensor unit 50 is not limited thereto. In the image sensor unit 50, the first masking shield 27a and the second masking shield 27b can be omitted. Even in this case, in the image sensor unit 50, the prism 51 can sufficiently reduce the disturbance light T3 guided to the lens 25. As a result, the image sensor unit 50 can reduce show-through.

In the prism 51, for example, a surface opposite to the conveyance path R can be a mirror surface. The mirror surface as a reflecting unit is formed by applying a paint (for example, silver) to the surface of the prism 51 for increasing the amount of light to be reflected or by attaching a film sheet, for example, silver foil, to the surface of the prism 51 for increasing the amount of light to be reflected. Accordingly, the prism 51 can prevent a decrease in the light T2 reflected toward the lens 25.

Figure 7:
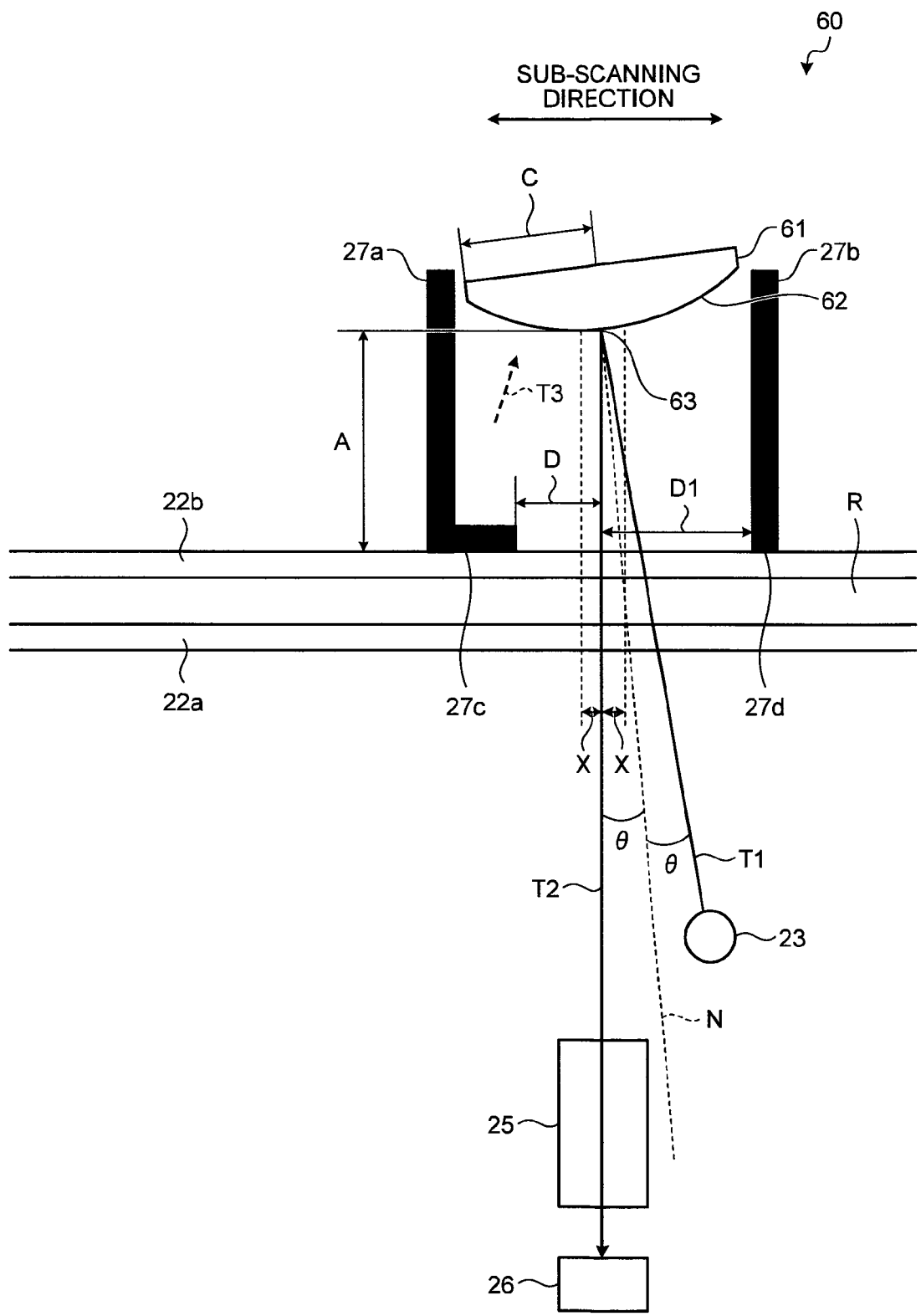
FIG. 7 is a schematic diagram for explaining a reflecting unit according to a fifth embodiment of the present invention.

FIG. 7 is a schematic diagram for explaining a reflecting unit according to a fifth embodiment of the present invention. An image sensor unit 60 according to the fifth embodiment has a feature in that it includes a curved light reflector 61, instead of the light reflector 24 according to the first embodiment shown in FIG. 2. The curved light reflector 61 has the same configuration as that of the light reflector 24, except that the mirror surface 24a of the light reflector 24 shown in FIG. 2 is replaced with a curved mirror surface 62 as a reflecting unit. The light T1 enters into an incident portion 63 on the curved mirror surface 62. The light T2 reflected by the incident portion 63 is guided to the lens 25. Although incident portion 63 of the curved light reflector 61 has a curved surface in the fifth embodiment, only the incident portion 63 can be formed in a flat surface. That is, it suffices that at least a part of the curved mirror surface 62 of the curved light reflector 61 is curved.

According to the above configuration, even if the disturbance light T3 enters into the curved mirror surface 62, the disturbance light T3 is reflected by the curved mirror surface 62 in a direction different from that towards the lens 25. Accordingly, the disturbance light T3 guided to the lens can be reduced. As a result, the image sensor unit 60 can reduce show-through. In the fifth embodiment, the image sensor unit 60 includes the first masking shield 27a and the second masking shield 27b, and the distance A, the size C, the error-assuming size X, and the incident angle θ satisfy the equation (3) or the distance A, the distance D, the error-assuming size X, and the incident angle θ satisfy the equation (4) or (4'). However, the image sensor unit 60 is not limited thereto. In the image sensor unit 60, the first masking shield 27a and the second masking shield 27b can be omitted. Further, in the image sensor unit 60, the distance A, the size C, the error-assuming size X, and the incident angle θ may not satisfy the equation (3), and the distance A, the distance D, the error-assuming size X, and the incident angle θ may not satisfy the equation (4) or (4'). Even in this case, in the image sensor unit 60, the curved light reflector 61 can sufficiently reduce the disturbance light T3 guided to the lens 25. As a result, the image sensor unit 60 can reduce show-through.

Figure 8:
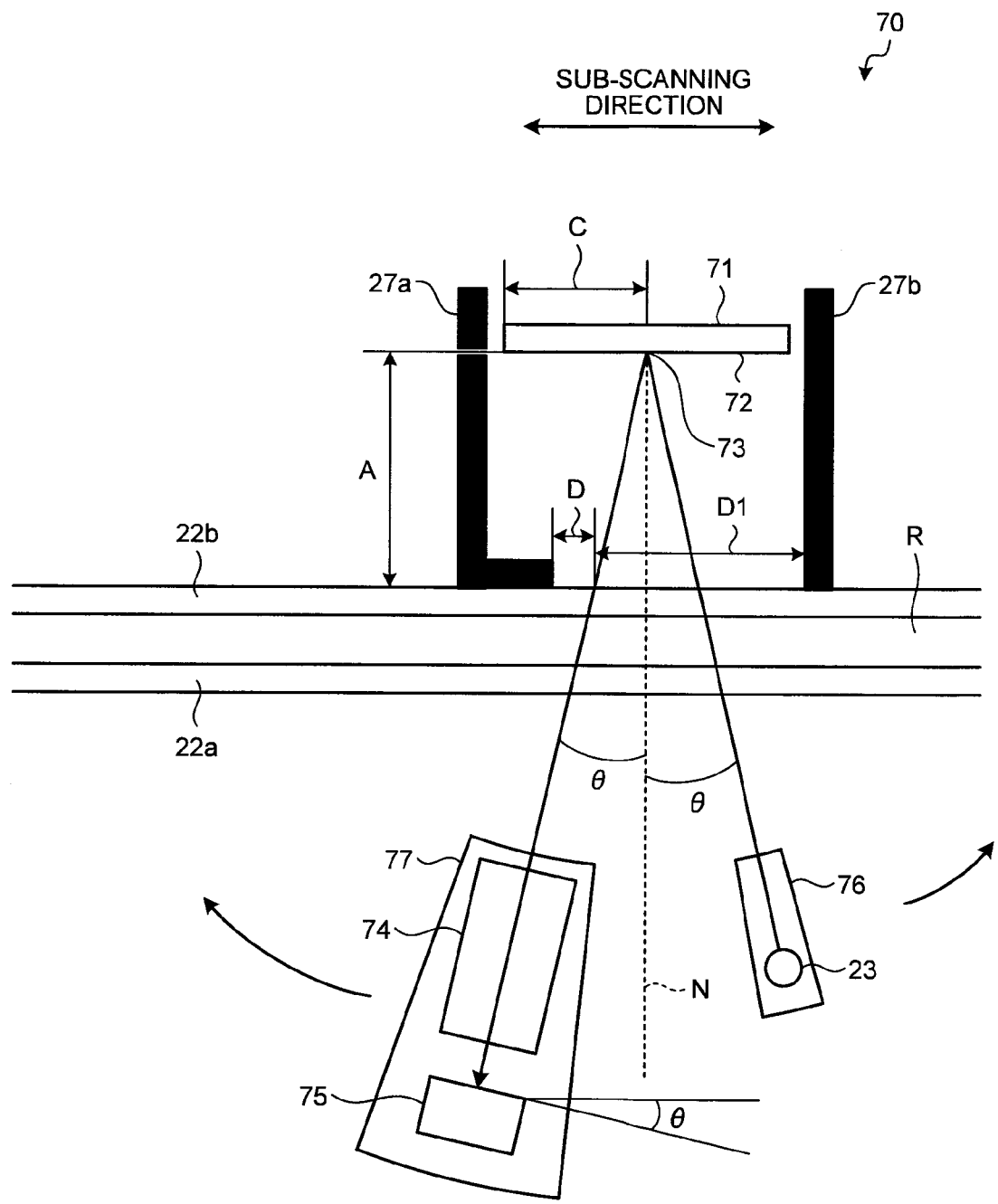
FIG. 8 is a schematic diagram for explaining a configuration of an image sensor unit according to a sixth embodiment of the present invention.

FIG. 8 is a schematic diagram for explaining the configuration of the image sensor unit according to a sixth embodiment of the present invention. An image sensor unit 70 according to the sixth embodiment shown in FIG. 8 has a feature in that a light reflector is parallel to the conveyance path R, and an image sensor inclines with respect to the conveyance path R. In the image sensor unit 70, constituent elements identical to those in the image sensor unit 20 are denoted by the same reference numerals and explanations thereof will be omitted. The image sensor unit 70 includes a light reflector 71, a lens 74, and an image sensor 75. The respective functions of the light reflector 71, the lens 74, and the image sensor 75 are the same as those of the light reflector 24, the lens 25, and the image sensor 26 shown in FIG. 2. In the following explanations, a different point of the respective components from those of the image sensor unit 20 shown in FIG. 2 is mainly explained.

The light reflector 71 is provided parallel to the conveyance path R. A surface of the light reflector 71 facing the conveyance path R is a mirror surface 72 as a reflecting unit. The light T1 enters into an incident portion 73 on the mirror surface 72 of the light reflector 71, and the light reflector 71 guides the light T2 to the lens 74. The image sensor 75 is provided, inclined with respect to the conveyance path R. An angle at which the image sensor 75 inclines with respect to the conveyance path R is θ, which coincides with the incident angle θ of the light T1. The lens 74 inclines with respect to the conveyance path R in the same manner as the image sensor 75. An angle at which the lens 74 inclines with respect to the conveyance path R is θ as well, which coincides with the incident angle θ of the light T1.

With the above configuration, the light reflector 71 and the image sensor 75 relatively incline with the angle θ. Consequently, the light reflector 71 is provided, inclined with respect to the image sensor 75, as viewed from the image sensor 75. Therefore, the image sensor unit 70 can reduce the disturbance light T3 guided to the image sensor 75 due to the same reason as in the image sensor unit 20 according to the first embodiment.

The image sensor unit 70 can have the same function as that of the image sensor unit 30 shown in FIG. 3. In this case, in the image sensor unit 70, the light source unit 23, the lens 74, and the image sensor 75 turn about the incident portion 73. For example, the image sensor unit 70 includes a first support 76 and a second support 77. The light source unit 23 is fixed to the first support 76. The lens 74 and the image sensor 75 are fixed to the second support 77. The first support 76 and the second support 77 turn in an opposite direction about the incident portion 73. The opposite direction includes a direction where the first support 76 and the second support 77 are away from each other, and a direction where the first support 76 and the second support 77 approach to each other. Also in this configuration, the image sensor unit 70 can adjust the incident angle θ. As a result, the image sensor unit 70 has the same effect as that of the image sensor unit 30 shown in FIG. 3.

The image reading apparatus according to the present invention can prevent light other than light irradiated from a light source from being guided to an image sensor. As a result, the image reading apparatus according to the present invention can reduce show-through.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
a conveying path that conveys a reading medium having thereon an image to be read;
a light source that irradiates light toward the conveying path, and irradiates the light toward the reading medium when the reading medium is conveyed;
an image sensor that picks up an image on the reading medium based on reflected light of the light by the reading medium; and
a light guiding unit that is provided on an opposite side to the light source with respect to the conveying path, the light guiding unit including
a reflecting unit that reflects a part of the light irradiated from the light source to guide the part of the light directly to the image sensor when the reading medium is not conveyed to the light guiding unit, and
a shielding unit provided between the reflecting unit and the image sensor in a direction orthogonal to the reading medium to reduce disturbance light incident to the image sensor, among the light irradiated from the light source and light having transmitted through the reading medium, when the reading medium is fed to the image sensor.

2. The image reading apparatus according to claim 1, wherein
the shielding unit further reduces an amount of light incident to the image sensor, which is irradiated from the light source, has transmitted through the reading medium, and is reflected by the reflecting unit.

3. The image reading apparatus according to claim 2, wherein
an incident angle θ of the light from the light source entering into the reflecting unit,
a distance A between an incident portion of the reflecting unit, to which the light from the light source enters, and the reading medium, and
a distance D, which is a distance in a plane orthogonal to a main scanning direction of the image sensor, and is a minimum distance between a path of light reflected by the reflecting unit and an end on a side of the reading medium of the shielding unit arranged on a side of the image sensor
satisfy an equation: $D < A \cdot \tan(2\theta)/(1-\tan(\theta)\cdot\tan(2\theta))$.

4. The image reading apparatus according to claim 2, wherein
a size C, which is a size in the plane orthogonal to a main scanning direction of the image sensor, and is a size between an incident portion of the reflecting unit, to which the light from the light source enters, and an end of the reflecting unit on the side of the image sensor,
an incident angle θ of the light from the light source entering into the reflecting unit, and a distance A between the incident portion and the reading target medium satisfy an equation: $C < A \cdot \tan(2\theta)/[\cos(\theta) + \sin(\theta) \cdot \tan(\theta)]$.

5. The image reading apparatus according to claim 2, wherein the shielding unit reduces an irradiance of light having transmitted through the reading medium into the reflecting unit.

6. The image reading apparatus according to claim 2, further comprising a color reference unit movably provided between the light source and the reflecting unit, so that the light irradiated from the light source is reflected and guided to the image sensor.

7. The image reading apparatus according to claim 2, wherein at least one of the image sensor and the reflecting unit is turnable.

8. The image reading apparatus according to claim 2, wherein the light guiding unit further includes a prism that is provided at a position between the reflecting unit and the reading medium and reduces disturbance light incident to the reflecting unit.

9. The image reading apparatus according to claim 2, wherein the reflecting unit has a shape such that a surface thereof on a side of the reading medium has a curved shape.

10. The image reading apparatus according to claim 1, wherein a size C, which is a size in a plane orthogonal to a main scanning direction of the image sensor, and is a size between an incident portion of the reflecting unit, to which the light from the light source enters, and an end of the reflecting unit on a side of the image sensor, an incident angle $\theta$ of the light from the light source entering into the reflecting unit, and a distance A between the incident portion and the reading medium satisfy an equation: $C < A \cdot \tan(2\theta)/[\cos(\theta) + \sin(\theta) \cdot \tan(\theta)]$.

11. The image reading apparatus according to claim 10, further comprising a color reference unit movably provided between the light source and the reflecting unit, so that the light irradiated from the light source is reflected and guided to the image sensor.

12. The image reading apparatus according to claim 10, wherein at least one of the image sensor and the reflecting unit is turnable.

13. The image reading apparatus according to claim 10, wherein the light guiding unit further includes a prism that is provided at a position between the reflecting unit and the reading medium and reduces disturbance light incident to the reflecting unit.

14. The image reading apparatus according to claim 10, wherein the reflecting unit has a shape such that a surface thereof on a side of the reading medium has a curved shape.

\* \* \* \* \*